UNITED STATES PATENT OFFICE.

JAMES J. HANSELMAN, OF BROOKLYN, NEW YORK.

LIQUID MANURE.

SPECIFICATION forming part of Letters Patent No. 415,246, dated November 19, 1889.

Application filed December 7, 1888. Serial No. 292,909. (Specimens.)

*To all whom it may concern:*

Be it known that I, JAMES J. HANSELMAN, of the city of Brooklyn, county of Kings, and State of New York, have invented a new and useful Improvement in Liquid Manure, of which the following is such full, clear, and exact description as will enable others skilled in the art to make and use the same.

This my invention is intended for use in the propagation and nourishment of plants, and more especially for those which flower or are used for ornamental purposes. It is especially designed and intended for use on such plants as are grown in baskets, stands, or other vessels in which moss, fibrous matter, or other like material is used as the substance in which the plants take root and grow in place of soil, and can also be used as a manure or fertilizer upon such plants as are growing in soil itself, whether in pots or open ground, in or out doors.

Before this my invention baskets, stands, or other vessels in which moss, fibrous matter, or like material has been used in place of soil for the plants to grow in have been used, but the plants live in such moss or similar material only for a very brief period, and have always failed to bloom, the reason for this being that the nutritive properties of the moss or other like material which had previously been prepared for use in such baskets, stands, or other vessels were speedily exhausted by the plants, which then withered and died. This has resulted from inability to add such nutritive properties to the moss or other like material as it became exhausted, and as no means were furnished by which such properties could be renewed the plants became sickly, prematurely decrepit, and died.
My liquid manure overcomes these difficulties, as it continuously furnishes and supplies all the nutritive properties necessary to the sustenance and natural and normal growth of the plant which is furnished by good well-fertilized soil. Compounds have heretofore been made which were intended to furnish these nutritive properties, but they have only partially succeeded. No one has, prior to my invention, succeeded in making a liquid manure for this purpose which will keep any length of time and retain the nutritive properties necessary to the life and normal growth of the plant, they having only been intended for use at the time of making the same.

My liquid manure not only sustains the life of the plant and maintains a natural growth, but also produces a bloom or flower, which all other compounds heretofore made have failed to do, and this whether said plant be herbaceous, bulbous, or hard-wooded. This my compound may also be used as a fertilizer in ordinary soil; but it is not necessary to use it so often as on the moss or other like material, as often as once in two or three weeks being sufficient. It also protects the plants from the ravages of insects and other vermin, and prevents worms from living in the moss or soil upon which it is used. It will keep, when barreled or bottled, for years, and thus becomes a merchantable article.

In the manufacture of my compound I use a tank or receptacle of any ordinary construction to contain water, which tank is placed within a box or chamber provided with an airtight cover or lid, this box or chamber being of sufficient size to contain the tank aforesaid, and also a pan or other receptacle in which sulphur is to be burned and sufficient room to allow the fumes of the burning sulphur to pass to and be absorbed by the water in the tank.

I have found that the best results are obtained from the use of the ingredients which form my compound in the following proportions: I place in the tank above mentioned a gallon of water, preferably distilled, although ordinary hydrant or well water will answer. I then place one ounce of sulphur on the pan or other receptacle in which the same is to be burned, ignite the same and close the airtight lid, and allow the sulphur to be entirely consumed and the gases or fumes from the thus burned sulphur to be entirely absorbed by the water in the tank, which occupies, generally, from two to three hours. Any other means may be used to acidulate the water with sulphurous acid. After the sulphur is entirely consumed and the fumes of the burning sulphur absorbed by the water I draw the thus treated water from the tank and place it in any suitable receptacle of sufficient size to contain it and the following substances in the following proportions, which I add to it: Cow dung or excrement, preferably fresh, (and I have found that the droppings from cows which have previously been fed with oil-meal gives the best results,) two pounds; guano, two ounces; soap, four drams, salt, two ounces; lime, one ounce; and isinglass, one dram. To these I add two ounces of spirits of ammonia. I have found that it is advisable to add the ammonia after the process of clarification hereinafter set forth is complete, and just before bottling or barreling the liquid, and have done so in practicing this my invention, as otherwise the ammonia speedily evaporates and more must be added to the compound to give it the desired properties. The ammonia may be omitted from the compound where it is designed for immediate or present use. These proportions may be varied without departing from the nature of this my invention. The receptacle which contains this mixture is fitted with a loose cover which will admit the atmosphere. The mixture must be stirred from day to day two or three times, and the scum or impurities which accumulate upon the surface must be removed once or twice daily. This is continued daily until fermentation is complete and the impurities no longer rise to the surface of the liquid, which generally occupies about one month. The surface of the liquid being clear, it is drawn off and the spirits of ammonia added in the hereinabove mentioned proportion, and it is then ready for bottling or barreling as desired, and is ready for use. It is then a clear liquid, free from all offensive odors.

I may omit from the compound some one or more of the ingredients mentioned without departing from the nature of my invention, and in practice I have omitted the guano, which is only added for the purpose of increasing the fertilizing properties of cowdung and furnishing additional strength, and without employing it I have obtained a good liquid manure.

In using my liquid manure I have found it best to use it in the proportion of one table-spoonful to one quart of water. I then take the moss, fibrous matter, or other like material to be used in the basket, stand, or other vessel as a substitute for soil, and place it in the mixture of water and liquid manure and allow it to remain therein for about forty-eight hours. Thus the moss becomes thoroughly impregnated and capable of sustaining plant life. I then take the thus treated moss and fill the basket or other vessel with it, planting therein such plants as are desired, first washing the roots of the plants in order that they may be free from soil. The plants in this basket, stand, or other vessel may be watered from time to time as plants usually are, care being taken that the moss does not become dry; but in order to renew and maintain the nutritive properties of the moss, prepared as above described, and keep plants and moss free from worms and insects it will be necessary about once a week to sprinkle the moss, plants, leaves, and all with the mixture of water and liquid manure in the proportions above specified. I have found it best in the case of baskets and small vessels to use a small watering-pot in sprinkling the plants. This will promote a healthy and natural growth of the plant and not, as has heretofore been the case with other compounds, cause a forced and immature growth which destroys the normal beauty of the plant. The blooms are also healthy and more lasting than those produced in soil in the ordinary way, and where other compounds have been used in baskets or other vessels, such as described, few, if any, blooms have been produced, and those have been delicate and sickly.

Large quantities of this liquid manure may be made, the above quantities being given to illustrate the proportions in which the various ingredients are to be used.

After bottling this liquid manure it should be kept in a cool dry place and well corked or otherwise protected from the atmosphere. Care must be taken not to expose it to the sun or great heat.

What I claim as new, and desire to secure by Letters Patent, is—

1. The liquid manure or compound consisting of water, sulphurous acid, soap, salt, lime, isinglass, spirits of ammonia, and the soluble parts of cow dung or excrement and guano, in the proportions herein set forth and specified.

2. The liquid manure or compound consisting of water, sulphurous acid, soap, salt, lime, isinglass, and the soluble parts of cow dung or excrement and guano, in the proportions herein set forth and specified.

3. The liquid manure consisting of water, sulphurous acid, soap, salt, lime, isinglass, and the soluble parts of cow dung or excrement and spirits of ammonia, as specified and set forth.

4. The liquid manure consisting of water, sulphurous acid, soap, salt, lime, isinglass, and the soluble parts of cow dung or excrement, as specified and set forth.

JAMES J. HANSELMAN.

Witnesses:
JOSEPH J. SULLIVAN,
S. F. SULLIVAN.